M. A. BUTTERFIELD.
CIRCLE CUTTING TOOL.
APPLICATION FILED FEB. 9, 1921.

1,423,828.

Patented July 25, 1922.

Maurice A. Butterfield, INVENTOR.

BY

Albert M. Moore, ATTORNEY.

UNITED STATES PATENT OFFICE.

MAURICE A. BUTTERFIELD, OF LOWELL, MASSACHUSETTS.

CIRCLE-CUTTING TOOL.

1,423,828.　　　　Specification of Letters Patent.　　Patented July 25, 1922.

Application filed February 9, 1921. Serial No. 443,660.

*To all whom it may concern:*

Be it known that I, MAURICE A. BUTTERFIELD, a citizen of the United States, residing at Lowell, in the county of Middlesex and Commonwealth of Massachusetts, have invented a certain new and useful Improvement in Circle-Cutting Tools, of which the following is a specification.

This invention relates to devices for circle-cutting tools or tools for cutting circular holes and circular and annular pieces as discs, washers and gaskets, and the like from sheet material, as of paper, leather, sheet metal or metallic alloys.

The objects of this invention are to enable the diameter or diameters of the circle or circles to be varied at will, readily and accurately; to regulate the pressure of the cutters, upon the work; to support the material to be cut throughout the extent of the part to be cut out, to prevent distortion or drawing or stretching of the material; to decrease the size and weight of the spindle by the use of truss-rods.

Figure 1:
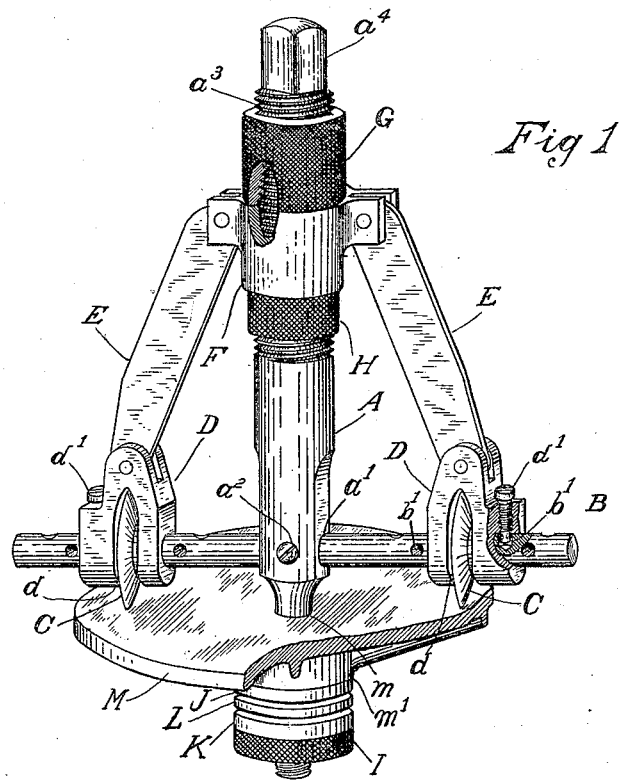
Figure 2:
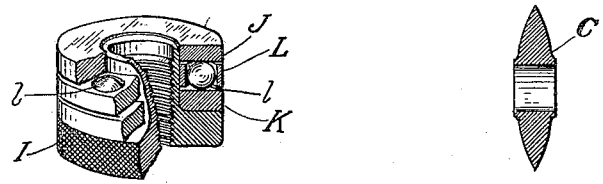
Figure 3:

In the accompanying drawing, Fig. 1, is a perspective view of my circle-cutting tool, a part of the work-supporting plate being broken away; Fig. 2, an oblique sectional view of the plate-supporting nut and the anti-frictional devices which allow the stock to be turned without turning the plate. Fig. 3 is a sectional view of the rotating cutter.

In the drawing, A indicates the stock and B a spindle rigidly secured to said stock at right angles therewith, as by insertion in a hole $a^1$ in said stock and retained in place by a set-screw $a^2$.

The spindle B projects on opposite sides of the stock and serves as an arbor for two freely rotating cutters C C of well known form, as used in cutting metal.

Each cutter is held from lateral movement by a locating or retaining yoke D D, which surrounds the spindle B and is slotted at $d$ to receive the corresponding cutter which turns freely in said slot. Each yoke D D is held at the desired distance from the stock by a screw-threaded pin $d^1$ $d^1$, which turns in a threaded hole $b^1$ in the yoke D D, there being any desired number of such holes $b^1$, each hole $b^1$ having a corresponding hole in the same axial plane of the spindle, on the opposite side the stock, and at an equal distance from the axis of said stock A.

Obviously, the tool as far as above described might be used in any machine-tool having a perforated table to support the work at right angles to the axis of the stock A and a suitable chuck or similar device to grasp the upper end of the stock.

But in order that the spindle may have sufficient stiffness and yet be as light as possible, I use truss-rods E E each jointed at one end $e$ $e$ to the corresponding locating yoke and at the other end at $e^1$ $e^1$ to a collar F, slidable on the stock A.

The collar F is held from rising on the spindle by the thrust-nut G and is checked by the lock-nut H.

To make the tool capable of use by muscular power, I provide the supporting plate M, which is preferably circular and has a central opening $m$ enabling said plate to slide freely on the corresponding end of the stock, which end is preferably reduced to allow of a smaller hole for the insertion of the stock than could otherwise be used.

The cutters are drawn against the top of the supporting plate by the nut I, which turns on the stock below the plate M. But between the nut I and the bottom of the supporting plate is an anti-friction device, represented as consisting of two washers J K having between them a ball-cage L, containing a series of anti-friction balls $l$, which project from the top and bottom of said cage against said washers. Said washers and ball-cage are pressed by the nut I upward, so that the upper washer bears against the boss $m^1$ on the underside of the plate.

It will be seen that the supporting-plate is held from turning by friction against the work, and the nut is free to turn with the stock A, so that the pressure of the cutters on the work is varied only by turning the nut I upon the stock A. The positive feeding of the cutters against the work by the turning of the stock would be impracticable owing to the variation of density and resistance of the work.

I claim as my invention:—

1. In a tool for cutting circular work from sheet material, the combination of a stock, cutters carried by said stock through a circle, by a single revolution of said stock, said stock being screw-threaded; a nut turning on said stock, on the opposite side of said work, from said cutters, washers loosely surrounding said stock between said nut and said work, a ball-cage surrounding said stock between said washers, and anti-friction balls carried by said cage and pressing against said washers.

2. In a tool for cutting circular work from sheet material, the combination of a stock, a work-supporting plate, having a hole, in which the end of said stock turns freely, cutters carried by said stock through a circle, by a single revolution of said stock, said stock being screw-threaded; a nut turning on said stock, on the opposite side of said plate, from said cutters, washers loosely surrounding said stock between said nut and said plate, a ball-cage surrounding said stock between said washers, and anti-friction balls carried by said cage and pressing against said washers.

3. The combination of a stock, externally screw-threaded, a collar slidable thereon, a nut turning on said stock to prevent outward movement of said collar and to provide means for adjusting the same, a spindle rigidly secured to said stock and projecting therefrom on opposite sides of the same, cutters rotary on said spindle on opposite sides of said stock, yokes slidable on said spindle, and truss-rods jointed to said yokes and said collar.

MAURICE A. BUTTERFIELD.